United States Patent
Li et al.

(10) Patent No.: US 10,616,792 B2
(45) Date of Patent: Apr. 7, 2020

(54) COMMUNICATIONS SYSTEM AND NETWORKING METHOD OF APPLICATION DRIVEN NETWORK, AND CONTROLLER

(71) Applicant: HUAWEI TECHNOLOGIES CO., LTD., Shenzhen, Guangdong (CN)

(72) Inventors: Yingtao Li, Shenzhen (CN); Dawei Huo, Shenzhen (CN); Shanfu Li, Shenzhen (CN); Gong Zhang, Shenzhen (CN); Rusong Jia, Shenzhen (CN)

(73) Assignee: Huawei Technologies Co., Inc., Shenzhen (CN)

( * ) Notice: Subject to any disclaimer, the term of this patent is extended or adjusted under 35 U.S.C. 154(b) by 11 days.

(21) Appl. No.: 15/976,033

(22) Filed: May 10, 2018

(65) Prior Publication Data

US 2018/0262944 A1  Sep. 13, 2018

Related U.S. Application Data

(63) Continuation of application No. PCT/CN2016/105513, filed on Nov. 11, 2016.

(30) Foreign Application Priority Data

Nov. 13, 2015  (CN) .......................... 2015 1 0779095

(51) Int. Cl.
*H04W 28/02* (2009.01)
*H04W 76/14* (2018.01)
(Continued)

(52) U.S. Cl.
CPC ....... *H04W 28/0268* (2013.01); *H04L 45/306* (2013.01); *H04L 45/64* (2013.01);
(Continued)

(58) Field of Classification Search
CPC ......... H04W 28/0268; H04W 28/0289; H04W 72/048; H04W 76/14; H04W 28/0215;
(Continued)

(56) References Cited

U.S. PATENT DOCUMENTS 7,599,686 B2 * 10/2009 Quinn .................. H04W 16/10
370/329
9,179,007 B1 * 11/2015 Yadav .................. H04M 15/66
(Continued)

FOREIGN PATENT DOCUMENTS

| CN | 101351034 A | 1/2009 |
|----|-------------|--------|
| CN | 102365554 A | 2/2012 |

(Continued)

*Primary Examiner* — Jay P Patel
(74) *Attorney, Agent, or Firm* — Rimon PC (57) ABSTRACT

Embodiments of the present Application provide a communications system of an application driven network. The communications system includes: a core controller, a network controller cluster, and an access point cluster. The core controller is configured to allocate at least one network controller in the network controller cluster and at least one access point in the access point cluster to form an application driven network, where the core controller is configured to: form an application control channel and manage the at least one access point, and the at least one access point is configured to form an application data channel. An access point in the access point cluster is configured to establish a communication channel with a terminal device, so that the terminal device accesses the control channel and the application data channel in the application driven network.

19 Claims, 3 Drawing Sheets

---

S102 — A core controller allocates, according to an application type, at least one network controller in a network controller cluster to form an application control channel of an application driven network, and allocates, according to the application type, at least one access point in an access point cluster to form an application data channel of the application driven network S104 — The core controller uses the network controller, the application control channel, the access point, and the application data channel to form the application driven network (51) Int. Cl.
  *H04W 72/04* (2009.01)
  *H04L 12/725* (2013.01)
  *H04L 12/715* (2013.01)
  *H04L 12/803* (2013.01)
  *H04L 12/853* (2013.01)
  *H04W 4/70* (2018.01)
  *H04W 88/12* (2009.01)
  *H04W 88/10* (2009.01)

(52) U.S. Cl.
  CPC ........ *H04L 47/125* (2013.01); *H04L 47/2416* (2013.01); *H04W 28/0215* (2013.01); *H04W 28/0289* (2013.01); *H04W 72/048* (2013.01); *H04W 76/14* (2018.02); *H04W 4/70* (2018.02); *H04W 88/10* (2013.01); *H04W 88/12* (2013.01)

(58) Field of Classification Search
  CPC ....... H04W 88/12; H04W 4/70; H04W 88/10; H04L 47/125; H04L 47/2416; H04L 45/306; H04L 45/64
  See application file for complete search history.

(56) References Cited

U.S. PATENT DOCUMENTS

| | | | |
|---|---|---|---|
| 9,736,719 B2* | 8/2017 | Kurmala | H04W 28/0231 |
| 9,825,815 B2* | 11/2017 | Bandyopadhyay | H04L 41/0896 |
| 2005/0130663 A1* | 6/2005 | Hong | H04L 1/0002 455/445 |
| 2009/0172552 A1* | 7/2009 | Segel | H04N 5/44543 715/733 |
| 2010/0110920 A1 | 5/2010 | Liu et al. | |
| 2010/0188992 A1 | 7/2010 | Raleigh | |
| 2012/0030699 A1* | 2/2012 | Amin | H04N 21/4325 725/28 |
| 2012/0054346 A1 | 3/2012 | Lee et al. | |
| 2013/0182606 A1* | 7/2013 | So | H04L 12/4641 370/254 |
| 2013/0185432 A1* | 7/2013 | So | H04L 45/586 709/226 |
| 2014/0092835 A1* | 4/2014 | Athley | H04W 24/02 370/329 |
| 2015/0296404 A1* | 10/2015 | Sharma | H04W 28/0215 370/230 |
| 2016/0205519 A1* | 7/2016 | Patel | H04L 67/16 455/518 |
| 2016/0212066 A1* | 7/2016 | Ravindran | H04L 47/80 |
| 2016/0227552 A1* | 8/2016 | Kurmala | H04W 28/0231 |
| 2017/0085486 A1* | 3/2017 | Chung | H04L 41/0893 |
| 2018/0332431 A1* | 11/2018 | Saily | H04W 60/04 |

FOREIGN PATENT DOCUMENTS

| | | |
|---|---|---|
| CN | 102932933 A | 2/2013 |
| CN | 103458466 A | 12/2013 |
| CN | 104009871 A | 8/2014 |
| CN | 104284372 A | 1/2015 |
| CN | 104935461 A | 9/2015 |
| EP | 2584832 A1 | 4/2013 |
| WO | 2009039318 A1 | 3/2009 |

\* cited by examiner

COMMUNICATIONS SYSTEM AND NETWORKING METHOD OF APPLICATION DRIVEN NETWORK, AND CONTROLLER

CROSS-REFERENCE TO RELATED APPLICATIONS

This application is a continuation of International Application No. PCT/CN2016/105513, filed on Nov. 11, 2016, which claims priority to Chinese Patent Application No. 201510779095.6, filed on Nov. 13, 2015, The disclosures of the aforementioned applications are hereby incorporated by reference in their entireties.

TECHNICAL FIELD

The present Application relates to the field of communications technologies, and in particular, to a communications system and a networking method of an application driven network, and a controller.

BACKGROUND

With development of mobile Internet technologies, and in particular, with emergence and popularization of intelligent terminals, such as mobile phones and tablet computers, an increasing quantity of users directly use these terminals to access a network. In addition, with rapid development of operating systems and hardware performance of terminals, lots of software originally used on a computer may be used on an intelligent, miniature, and mobile terminal, and in particular, social software is frequently used. The software is generally instant messaging software, and a connection between the software and a network is characterized by abruptness and timing. A piece of instant messaging software is used as an example. The software sends a heartbeat packet on an operating system of a terminal every two minutes, so that the terminal periodically notifies a server of a status of the terminal. When using instant messaging software, a terminal generates a large amount of network signaling to maintain a connection to a server, and the generated signaling is only used for transmitting a few bytes. In a severe case, the signaling may affect a normal service of a network. In addition, considering a development prospect of a future network, a large quantity of terminals are to be connected to the network, and similar to sending an instant message, many terminals discontinuously send data having relatively little content and a relatively short length to the network. As a quantity of terminals increases, a large quantity of network signaling resources are consumed.

SUMMARY

Embodiments of the present Application provide an application driven network, so that a control channel dedicated for an application is established according to various types of applications, to form the application driven network. Control signaling of various types of applications is separated from each other. Further, a network can be adjusted and optimized according to a network signaling congestion status.

In an existing network, none of control signaling channels are distinguished. In addition, services of various network types are mixed in one network, and therefore signaling congestion on a type of network may easily cause another type of network to be unavailable or even break down. In addition, with a sharp increase of network types and access traffic, a higher requirement for use efficiency of a data channel is imposed, and an existing networking mode in which the services of various network types are mixed cannot meet the network requirement.

The embodiments of the present Application propose a concept of an application driven network, and propose networking for an application Application for network delayering. After network hardware is established, application driven networks corresponding to all applications are established for various types of applications. The application driven networks are, for example, a voice network (for example, a cellular voice communications network), a data network (for example, an IP network), and a machine-to-machine network (for example, a water meter network, a transportation network, a public security management network, and a finance management network), and all applications may rent corresponding network resources. Alternatively, for example, a corresponding network may be established for an instant messaging application. In practice, a person may also establish a personal private network by applying to a network hardware provider. Application driven networks are communications networks configured or established by a core server in a physical network. An application type herein may also be a service type.

A communications system in the embodiments of the present Application includes two layers of control channels and one layer of data channel, and a control plane and a control channel are not distinguished in comparison with a conventional network. A control channel is established for the application according to various types of applications, to form an application driven network. Control signaling of various types of applications is separated from each other. In an implementation, an application driven network may be a dedicated network of the application. During specific application, the application driven network runs as a dedicated network, and this helps network management and network optimization, and easily avoids impact, on an application service, of signaling flood or congestion caused by another application.

In a technical solution of the present Application, a physical network may be configured, and communications networks corresponding to all applications are separately formed according to application types. According to the solution of the embodiments of the present Application, the physical network includes three layers. A first control channel layer including a core controller may be referred to as a layer S, and is the first layer of the network. The core controller may be a device, such as a core controller entity, a server, or a gateway, that has a network configuration and management function. At this layer, all devices are devices $S_1, S_2, \ldots,$ and $S_i$ at the layer S. A second control channel layer including a network controller is a core control sublayer, may be referred to as a layer C, and is the second layer of the network. The network controller may be a device, such as a network controller entity, a server, or a gateway, that has a network scheduling and management function. At this layer, all devices are devices $C_1, C_2, \ldots,$ and $C_i$ at the layer C. A data channel layer including an access point may be referred to as a layer D and is the third layer of the network. Access point devices can communicate with each other, provide a communication channel for a user terminal device, and are managed and scheduled by the core controller and the network controller. The access point devices may be wireless network access devices such as wireless base stations Base Station or access points, or may be wired access devices in some cases. The user terminal device accesses the network by using an access point (a wireless base station BS, an access point AP, or the like). The second layer and the third layer are managed by the core controller to form application driven networks of various applications. When using various applications, the terminal accesses corresponding networks by using access devices. In a network system architecture of the present Application, a core controller may be included, and a quantity of core controllers may be adaptively configured according to a network capacity. The network controller may be a network controller cluster and the access point may be an access point cluster. After all application driven networks are formed, various types of applications transmit signaling of the applications by using respective application driven networks, and the signaling is transmitted between the second layer and the third layer and is not spread to the first layer, namely, the layer S. Various data required by the applications is mainly transmitted by means of communication between the third layer and a corresponding service data server, an application server, and the like. In specific application driven networks that are of various applications and include the second layer and the third layer, a network controller has a management function, schedules and manages an access point, and performs network optimization on the application driven network, so as to ensure QoS, QoE, and the like. When congestion or network disconnection occurs in a specific application driven network, or when network quality is affected, a core server performs configuration again, and forms a new application driven network. When the application driven network can provide a service normally, a network controller performs network management. A network controller that assumes a management role may be specified by a core controller, and a management relationship about managing a data channel by the network controller is established by the core controller.

According to a first aspect of the embodiments of the present Application, a communications system of an application driven network is provided, and control channels in the communications system are classified and separated according to application types. The communications system includes: a core controller, a network controller cluster, and an access point cluster.

According to the first aspect of the embodiments of the present Application, the core controller is configured to allocate a network controller in the network controller cluster and an access point in the access point cluster according to an application type, to form an application driven network, where the application driven network provides a service for an application Application corresponding to the application type. The network controller in the network controller cluster is configured to provide an application control channel in the application driven network. The access point in the access point cluster is configured to: provide an application data channel in the application driven network, and establish a communication channel with a terminal device, so that the terminal device accesses the application driven network.

In an implementation of the first aspect, the core controller is further configured to: establish a management relationship about managing the access point by the network controller in the application driven network, and send the management relationship to the network controller. After receiving the management relationship, the network controller schedules and manages the access point in the application driven network. An available management policy includes a QoS (Quality of Service) management policy, a QoE (Quality of Experience) management policy, a priority queue management policy, or the like of the data channel of the access point. The core controller may allocate one network controller to one application driven network, and in more cases may allocate multiple network controllers to one application driven network. The core controller selects one of the network controllers, or selects multiple network controllers according to a network capacity as a network controller that has a management function in the application driven network. The network controller schedules and manages an access point in the application driven network, and is equivalent to a management unit in the specific application driven network. The core controller establishes the management relationship according to quantities of allocated network controllers and access points and a logical relationship. The network controller that has a management unit function performs management within the application driven network according to the management relationship, thereby implementing dynamic adjustment and optimization in the application driven network, making use of a network capability as far as possible, reducing adjustment that is on application driven network allocation by the core server and is triggered by a change of a user, and the like.

In an implementation of the first aspect, a core server of the core controller is further configured to determine the application type according to time-dependent distribution of a quantity of users. An application whose quantity of users accessing a network meets Poisson distribution is the voice application, an application whose quantity of users accessing a network meets power-law distribution is a data application, and an application whose quantity of users accessing a network meets Markov distribution is a machine-to-machine application. The core controller may obtain a user access status from an application server or a service center of each application, or from a report of each network controller, or from user registration information or identity information, and may analyze obtained big data to determine a type of each application. Alternatively, the time-dependent distribution of a quantity of users may be statistical data that is obtained by a core control layer from another device and that is for a specific application/service access status, or may be data that is obtained by a core control layer by means of statistical analysis in a period of time and that is for a specific application/service access status.

In another implementation of the present Application, when a network system is deployed, network controllers or access points may be allocated to form various application driven networks, and an application driven network provides a service for an application Application corresponding to the application type.

For a voice application service, for example, making a call or voice intercom, the core controller allocates a particular network controller and a particular access point to form a voice communications network. In the voice communications network, communication and transmission for a voice application are performed. The allocated network controller establishes a voice signaling channel in the voice communications network, and the access point forms a voice transmission channel in the voice communications network. The access point may establish communication with a corresponding server or a communication peer for voice transmission.

For a data application, for example, a data service such as an Internet data service, content data, or a mail system, the core controller allocates one or more particular network controllers and one or more particular access points to form a data communications network. The at least one network controller forms a data signaling control channel in the data communications network, and the at least one access point forms a data transmission channel in the data communications network. The access point may establish communication with a corresponding server or a communication peer for data transmission.

For a machine-to-machine network, for example, various dedicated machine-to-machine networks such as a water meter network, a public security monitoring network, and a finance service network, the core controller allocates one or more particular network controllers and one or more particular access points to form a data communications network. The at least one network controller forms a machine-to-machine signaling control channel, and the at least one access point forms a data transmission channel in the machine-to-machine network. The access point may establish communication with a corresponding server or a communication peer for data transmission of a machine-to-machine service application.

A network of a particular service type may further be established, for example, an instant messaging IM network.

According to a second aspect of the embodiments of the present Application, a networking method of an application driven network by using the foregoing communications system, and a core controller and a network controller in the communications system are provided. The networking method of an application driven network includes configuring the deployed communications system according to application types, to form application driven networks. Each application driven network provides a service for a corresponding application. A core controller allocates, according to the application type, at least one network controller in a network controller cluster to form an application control channel of the application driven network, and allocates, according to the application type, at least one access point in an access point cluster to form an application data channel of the application driven network. The at least one network controller, the application control channel, the at least one access point, and the application data channel form the application driven network, and the application driven network provides a service for an application Application corresponding to the application type. Then, an access point in the access point cluster establishes a communication channel with a terminal device, so that the terminal device accesses the control channel and the application data channel in the application driven network. The core controller and the network controller in the communications system are configured to: complete the foregoing method to implement various functions, and establish an application driven network to provide a service for a corresponding application.

According to the communications system provided in the embodiments of the present Application, the communications system includes three layers. The core controller at the first layer allocates the network controller at the second layer and the access point at the third layer according to the application type, to form the application driven network, and the application driven network serves the corresponding application. In the communications system, signaling and control signals of various applications are separated from each other, and specific application networks used by the applications in a network are independent of each other. This can effectively reduce network congestion and impact of a network problem of an application on another application. In addition, the three-layer network can dynamically establish various application driven networks, so that network utilization of an operator is improved, and a network is more flexibly used.

BRIEF DESCRIPTION OF DRAWINGS

To describe the technical solutions in the embodiments of the present Application more clearly, the following briefly describes the accompanying drawings required for describing the embodiments. Apparently, the accompanying drawings in the following description show merely some embodiments of the present Application, and a person of ordinary skill in the art may still derive other drawings from these accompanying drawings without creative efforts.

DESCRIPTION OF EMBODIMENTS

The following describes the technical solutions in the embodiments of the present Application with reference to the accompanying drawings in the embodiments of the present Application.

Figure 1:
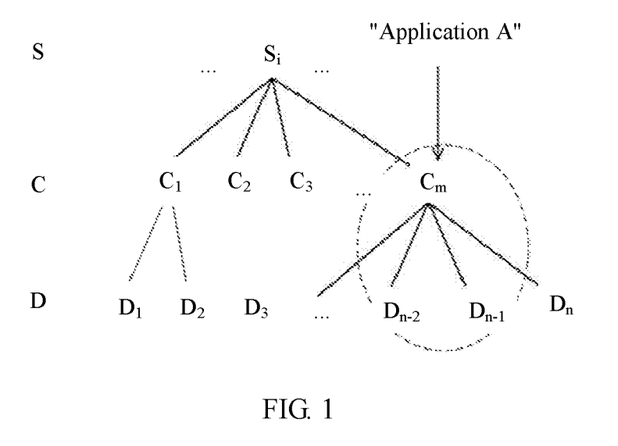
FIG. 1 is a schematic diagram of an architecture of a communications system of an application driven network according to an embodiment of the present Application.

Referring to FIG. 1, FIG. 1 is a schematic diagram of an architecture of a communications system of an application driven network (ADN) according to an embodiment of the present Application. The communications system includes three layers. The first layer, a layer S, is the first control channel layer, also referred to as a core control layer, and includes a core controller. The second layer, a layer C, is the second control channel layer, also referred to as an allocation control sublayer, and includes a network controller cluster. Logical connection relationships between network controllers in the network controller cluster are allocated and managed by the core controller. The third layer is a communications link layer, a layer D, and includes an access point cluster. Logical connection relationships in the access point cluster are allocated and managed by the core controller, to provide channels and networks of valid data for user equipment. In this embodiment, the network architecture includes a three-layer structure.

The core controller or the core controller layer S (the first control channel layer) is configured to allocate, according to an application/service type (Application), a network controller that forms the second control channel C (the second layer, the control sublayer, or the network control layer) and an access point that forms the data channel layer D (the third layer, or the communications link layer), so as to form a network that is driven by this application type and that is referred to as an application driven network. In addition, the core controller establishes a management relationship about managing a data channel by the network controller in the application driven network, so as to establish the network driven by this application/service type. The control sublayer serves as a control channel, and the data channel layer D serves as a data channel of this type of application/service.

The network controller cluster constructs the control sublayer C, and is configured to: receive a service request from a user or a resource control request from a network device, and allocate a data channel to the request; or may be configured to: adjust and control the data channel layer according to a control policy developed by the core control layer, and send a control command to the data channel layer.

The network controller cluster is managed by the core controller, and the core controller selects a network controller in the cluster according to the application type to form an application control channel. The control channel provides a control channel for an application of a particular application type, and transmits control signaling in a use process of the application. The control signaling is, for example, a heartbeat packet of an instant messaging application, No. 7 signaling of a voice application, a transmission protocol of a machine-to-machine network, and TCP/IP protocol signaling and SIP protocol signaling of a data application. Technologies of corresponding signaling signals in various types of applications are mature in the prior art, and the control sublayer develops a transmission channel for a particular type of application for transmitting signaling required by this type of application. The access point cluster provides the data channel layer D, configured to: communicate with a user terminal device, and provide a data channel according to control commands of the core control layer and the control sublayer. The user terminal device may be various intelligent terminals.

In FIG. 1, for example, a core controller $S_i$ allocates a network controller Cm and access points $D_{n-2}$ and $D_{n-1}$ to an application A to form a network that is driven by the application A and that serves the application A. The core controller $S_i$ may adaptively adjust, according to a factor such as a user quantity, signaling, or a data amount of the application A by using quantities of allocated network controllers and allocated access points, a size of the network driven by the application A. After allocating the network driven by the application A, the core controller $S_i$ establishes a management relationship and management logic about managing the access points $D_{n-2}$ and $D_{n-1}$ by the network controller Cm. After the network driven by the application A is not used, the network controller Cm and the access points $D_{n-2}$ and $D_{n-1}$ may be further allocated to another application driven network, so as to improve utilization and flexibility of network devices. In addition, in a process of deploying a network device, a network device may be deployed once to implement a network service of multiple functions. In a specific implementation, for some network with extremely low activeness, for example, a water meter overrun system (possibly a network in which data is generated monthly) in a machine-to-machine network, the network controller or the access point may be reused.

That the core control layer establishes, according to an application/service type, a management relationship about managing the data channel layer by the control sublayer includes: for a voice communication application/service, selecting, by the core control layer, a network controller C1 from the control sublayer as a control device, and selecting k data channels from the data channel layer, to form a voice communications network, where the network model meets Poisson distribution; for a data communication application/service, selecting, by the core control layer, a network controller C2 from the control sublayer as a control device, and selecting m data channels from the data channel layer, to form a data communications network, where the network model meets power-law distribution; and for a machine-to-machine (M2M, Machine to Machine) communication application/service, selecting, by the core control layer, a network controller C3 from the control sublayer as a control device, and selecting f data channels from the data channel layer, to form a machine-to-machine communications network, where the network model meets Markov distribution, and k+m+f<n. In this way, C1, C2, and C3 each include control information of a different application/service, and are separated from each other. When control information congestion occurs in the network of C1 for voice communication, congestion does not spread to control sublayers of C2 and C3. Therefore, even if control information congestion occurs in the voice communications network, the data communications network and the machine-to-machine network are not affected and can run normally. That the voice communications network model meets the Poisson distribution means that time-dependent distribution of a quantity of users accessing (making a call in) the network meets the Poisson distribution. That the data communications network model meets the power-law distribution means that time-dependent distribution of a quantity of users accessing the data network meets the power-law distribution. That the machine-to-machine communications network model meets the Markov distribution means that time-dependent distribution of devices accessing the network meets the Markov distribution. The time-dependent distribution of the quantity of users may be statistical data that is obtained by the core control layer from another device and that is for a specific application/service access status, or may be data that is obtained by the core control layer by means of statistical analysis in a period of time and that is for a specific application/service access status.

Control information of the network controller C1 mainly includes voice calling signaling information, voice called signaling information, channel scheduling signaling information, and the like, for example, No. 7 signaling and Session Initiation Protocol (Session Initiation Protocol, SIP for short) signaling. Control information of C2 includes a Transmission Control Protocol/Internet Protocol (Transmission Control Protocol/Internet Protocol, TCP/IP) handshake protocol, heartbeat information, a status report, a link or media transmission negotiation message, and the like. Control information of C3 includes SIP signaling, a TCP/IP handshake protocol, a status report, and the like. It may be learned that same control information may be used in different network models.

Figure 2:
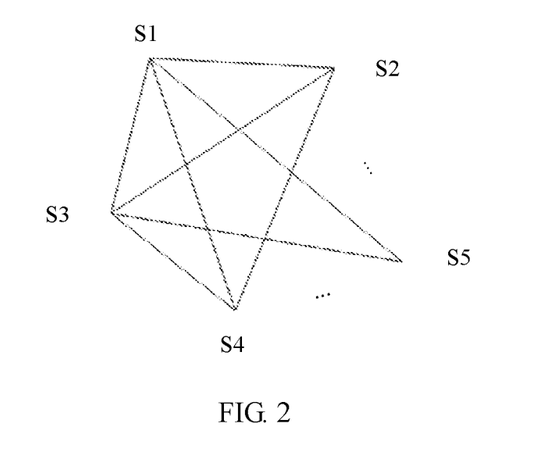
FIG. 2 is a networking structure of a core control layer according to an embodiment of the present Application.

Referring to FIG. 2, FIG. 2 is a networking structure of a core control layer according to an embodiment of the present Application. At the core control layer, i network elements (core controllers) are connected in a fully interconnected structure, that is, network elements may communicate with each other by means of a direct connection. An operator may establish a wide-coverage network by deploying multiple core controllers S.

Figure 3:
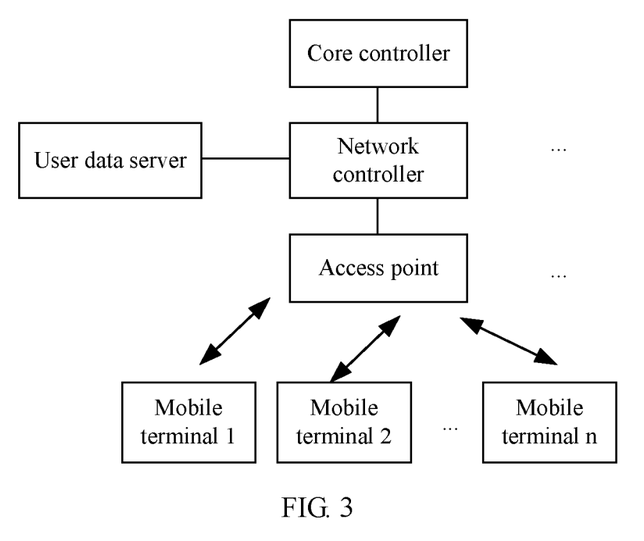
FIG. 3 is a schematic diagram of a networking architecture of an application driven network according to an embodiment of the present Application.

Further, FIG. 3 is diagram of a networking architecture of an application driven network according to an embodiment of the present Application. A core controller is corresponding to the core control layer (the layer S), a control sublayer control unit and a user data server are corresponding to the control sublayer (the layer C), and a wireless base station is corresponding to the data channel layer (the layer D). The core controller establishes various application driven networks of the control sublayer C and the data channel layer D according to the foregoing application/service. The core controller selects a network controller according to an overall control policy, for example, according to the application/service, and configures a data channel (the layer D) as required. The data channel may be a physical channel that includes one or more base stations and that is corresponding to the application/service of the control sublayer, or may be a physical channel that includes some air interface resources of a base station and that is corresponding to the application/service of the control sublayer. The some air interface resources are communications interfaces that are divided from air interface resources of the base station in a frequency domain or a time domain and that are used for connection to a terminal device. In addition, the overall control policy of the core controller includes: increasing or decreasing a quantity of data channels according to access traffic and a congestion degree of a network, establishing a logic relationship of the control sublayer according to an application/service type, updating and delivering a policy of managing the data channel by the network controller, and the like. The policy of managing the data channel by the network controller includes a QoS (Quality of Service) management policy, a QoE (Quality of Experience) management policy, a priority queue management policy, or the like. The control sublayer unit communicates with the user data server and reads various information of a connected terminal device including user agreement information, a user level (QoS or QoE), a priority, home information, and the like. After reading the foregoing information, the control sublayer schedules and allocates a data channel to a terminal device according to the management policy. Specifically, in a network (the voice communications network, the data communications network, the machine-to-machine network, or the like) established by the control sublayer C and the data channel layer D, the network controller schedules and manages the data channel (the layer D), and when the terminal device accesses or needs to occupy the data channel, the terminal device communicates with the control sublayer unit by using the base station. The control sublayer unit reads user information corresponding to the terminal device from the user data server according to identification information of the terminal device, and then schedules or allocates the data channel to the terminal device according to the management policy. Typically, when the terminal device applies to occupy a data channel, the control sublayer unit reads that a corresponding user priority is highest, and a data channel is preferentially allocated to the terminal device during data channel scheduling.

When scheduling signaling of the control sublayer of the foregoing application driven network is fully occupied or data channels are fully occupied, and the network is severely congested and even cannot work normally, the control sublayer unit sends a message to the core controller to prompt a problem of resource insufficiency in the network. The core control layer collects and analyzes, from the control sublayer unit, a cause for the resource insufficiency, and processes the network of the control sublayer C and the data channel layer D. A processing manner includes: running the control sublayer in an existing manner, updating the management policy of the control sublayer, and increasing data channels of the layer D in the network, that is, increasing a quantity of base stations or defining more communications interfaces in a base station as data channels in the network. Alternatively, a problem occurs during running of the application driven network, the core controller S is triggered to reallocate and re-plan the application driven network for the application.

Figure 4:
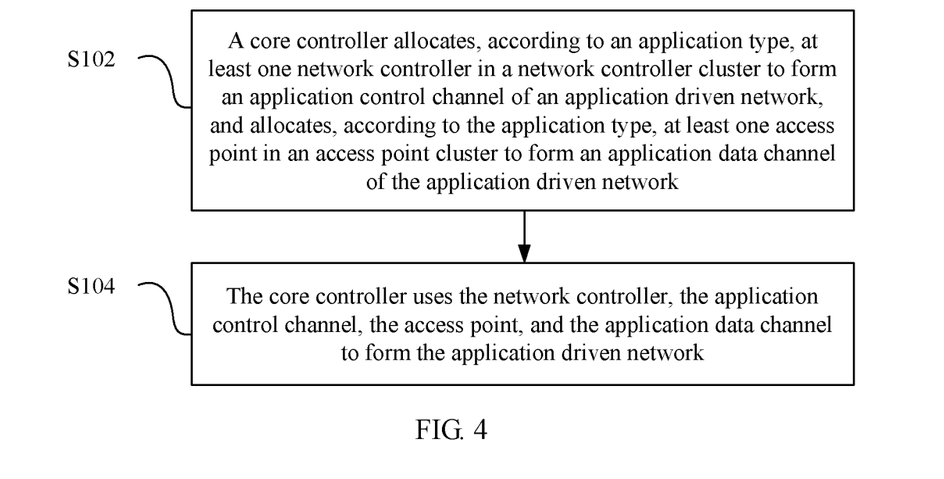
FIG. 4 is a flowchart of a networking method of an application driven network according to an embodiment of the present Application.

Referring to FIG. 4, an embodiment of the present Application provides a networking method of an application driven network, and the method includes the following steps:

S102. A core controller allocates at least one network controller in a network controller cluster according to an application type to form an application control channel of the application driven network, and allocates at least one access point in an access point cluster according to the application type to form an application data channel of the application driven network.

S104. The core controller uses the network controller, the application control channel, the access point, and the application data channel to form the application driven network, and the application driven network provides a service for an application Application corresponding to the application type.

After the application driven network is established by using the foregoing method, an access point in the access point cluster establishes a communication channel with a terminal device, so that the terminal device accesses the control channel and the application data channel in the application driven network. The terminal device may adapt to a corresponding application and service by using the application driven network.

In a specific implementation, a core server of the core controller determines the application type according to time-dependent distribution of a quantity of users. An application whose quantity of users accessing a network meets Poisson distribution is a voice application, an application whose quantity of users accessing a network meets power-law distribution is a data application, and an application whose quantity of users accessing a network meets Markov distribution is a machine-to-machine application. The core controller may obtain a user access status from an application server or a service center of each application, or from a report of each network controller, or from user registration information or identity information, and may analyze obtained big data to determine a type of each application. Alternatively, the time-dependent distribution of a quantity of users may be statistical data that is obtained by a core control layer from another device and that is for a specific application access status, or may be data that is obtained by means of statistical analysis by the core control layer in a period of time and that is for a specific application access status.

In a corresponding application driven network, the application control channel provided by the network controller transmits corresponding signaling or a corresponding control signal, and the application data channel provided by the access point transmits corresponding application content data, for example, voice, network data, content data, and machine-to-machine data.

In another implementation, during network deployment, the core controller is configured, and a policy of identifying an application by the core controller or a trigger condition of allocating an application driven network according to a service type is configured. In a process of driving a network by an application, the core controller establishes an application driven network for an application, that is, the core controller allocates an application driven network according to an application type. Certainly, in some particular cases, the access point or the network controller may be reused between application driven networks.

Figure 5:
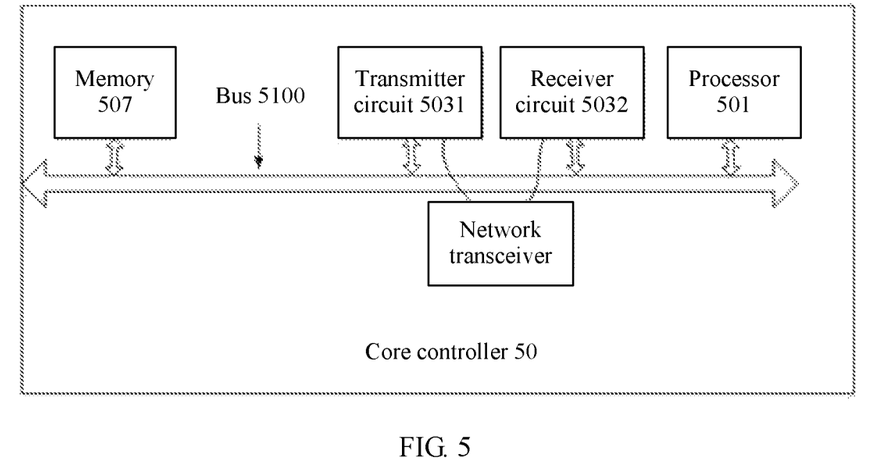
FIG. 5 is a schematic structural diagram of a core controller according to an embodiment of the present Application.

An embodiment of the present Application further provides a core server, and the core server is used in a communications system of an application driven network. The core server and the foregoing embodiments are based on a same Application concept. Referring to FIG. 5, a core controller 50 provided in the present Application includes a processor 501, a network transceiver (transceiver), a memory 507, and a bus 5100. The transceiver includes a transmitter circuit 5031 and a receiver circuit 5032. All components of the core controller 50 are coupled together by using a bus system 5100. In addition to a data bus, the bus system 5100 further includes a power bus, a control bus, and a status signal bus. However, for clear description, various types of buses in the figure are marked as the bus system 5100.

The processor 501 is configured to determine at least one network controller in a network controller cluster and at least one access point in an access point cluster according to an application type to form a driven network, where the network controller provides an application control channel, the access point provides an application data channel, and the application driven network provides a service for an application Application corresponding to the application type. The processor can obtain application types of various applications, and then allocate an application driven network. The processor 501 may be a general purpose processor, a digital signal processor (DSP), an application-specific integrated circuit (ASIC), a field programmable gate array (FPGA) or another programmable logic device, a discrete-gate or transistor logic device, or a discrete hardware component. The processor 501 may implement or execute the methods, steps, and logical block diagrams disclosed in the embodiments of the present Application. A general purpose processor may be a microprocessor, or the processor may be any conventional processor, decoder, or the like. The processor further has a capability and function of determining an application type. Therefore, the processor can further be configured to determine the application type according to time-dependent distribution of a quantity of connected users. It is detected that an application whose quantity of users accessing a network meets Poisson distribution is a voice application, an application whose quantity of users accessing a network meets power-law distribution is a data application, and an application whose quantity of users accessing a network meets Markov distribution is a machine-to-machine application. The processor further includes a scheduling controller, configured to: generate a management relationship about managing the access point in the application driven network, and send the management relationship to the network controller, where the management relationship is used for performing scheduling management by the network controller on the access point.

The memory 507 is configured to store a program and data that are executed by the processor for network control. The memory 507 may include a read-only memory and a random access memory, and provides a required program, signaling, data, or the like for the processor 501. A part of the memory 507 may further include a nonvolatile random access memory (NVRAM).

The transceiver includes the transmitter circuit 5031 and the receiver circuit 5032 and is configured to receive and send information of the network controller cluster and the access point cluster, for example, send the management relationship that is about managing the access point in the application driven network and that is generated by the scheduling controller to a corresponding network controller, and send a configuration command of allocating an application driven network.

The core controller 50 provided in the present Application implements, by means of coordination of all the execution modules, all functions and steps implemented by the core controller in the method and system embodiments.

Figure 6:
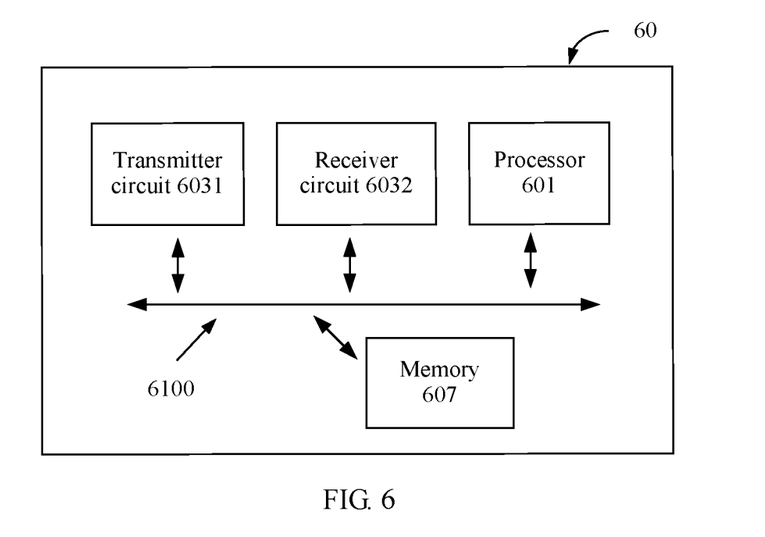
FIG. 6 is a schematic structural diagram of a network controller according to an embodiment of the present Application.

An embodiment of the present Application further provides a network server, and the network server is used in a communications system of an application driven network. The network server and the foregoing embodiments are based on a same Application concept. Referring to FIG. 6, a network controller 60 provided in the present Application includes a processor 601, a network transceiver 603 (transceiver), a memory 607, and a bus 6100. The transceiver 603 includes a transmitter circuit 6031 and a receiver circuit 6032.

The transceiver 603 is configured to: receive and send information between the network controller and each of a core controller and an access point, and receive a management command sent by the core controller. The transceiver 603 implements information exchanges with another device in a network, obtains information from the network, and sends, to the network, information sent externally by the network controller, so as to achieve an objective.

The processor 601 is configured to obtain the management command sent by the core controller, and generate a control channel logical relationship in the application driven network to establish a control channel. The processor 601 may be a general purpose processor, a digital signal processor (DSP), an application-specific integrated circuit (ASIC), a field programmable gate array (FPGA) or another programmable logic device, a discrete-gate or transistor logic device, or a discrete hardware component. The processor 601 may implement or execute the methods, steps, and logical block diagrams disclosed in the embodiments of the present Application. A general purpose processor may be a microprocessor, or the processor may be any conventional processor, decoder, or the like.

The memory 607 is configured to store a program and data that are executed by the processor. The memory 607 may include a read-only memory and a random access memory, and provides a required program, signaling, data, or the like for the processor 601. A part of the memory 307 may further include a nonvolatile random access memory (NVRAM).

In a higher-order network controller, the transceiver 603 is further configured to receive a management relationship in the application driven network sent by the core control. In this case, the network controller has a function of associating with the access point. The processor 601 is further configured to: obtain the management relationship, and perform scheduling management on the access point in the application driven network according to a management policy by using the management relationship, where the management policy includes a QoS (Quality of Service) management policy, a QoE (Quality of Experience) management policy, or a priority queue management policy of the data channel of the access point. The processor is further configured to: monitor a load status of the data channel of the access point, and manage a user access status of the access point; or monitor a load status of the control channel, and send the load status to the core controller. The network controller implements association with and scheduling of the access point by using these functions. By detecting various running statuses of the access point, in the application driven network, a logic relationship of the access point and connection relationships of the application control channel and the application data channel are adaptively adjusted and scheduled. When a problem that cannot be resolved by the network controller occurs, or when a network change is relatively great, or when a terminal device change is relatively great, feedback is sent to the core controller to trigger adjustment and optimization for a new application driven network. The core controller 60 provided in the present Application implements, by means of coordination of all the execution modules, all functions and steps implemented by the core controller in the method and system embodiments.

According to the communications system and the method provided in the embodiments of the present Application, in the communications system, application driven networks are established for various applications, and various signaling or control signals of the applications are transmitted in corresponding application driven networks and are separated from each other. Specific application networks used by the applications in the network are independent of each other. This can effectively reduce network congestion and impact of a network problem of an application on another application. In addition, the three-layer network can dynamically establish various application driven networks, so that network utilization of an operator is improved, and a network is more flexibly used. The core controller and the network controller provided in the present Application can implement the application driven network.

What is claimed is:

1. A communications system of an application driven network (ADN), wherein the communications system comprises:
a core controller, a network controller cluster, and an access point cluster; wherein
the core controller is configured to determine an application type of an application according to a time-dependent distribution of a quantity of connected users, and allocate a network controller in the network controller cluster and an access point in the access point cluster according to the application type, to form an application driven network, wherein the application driven network provides a service for the application;
the network controller in the network controller cluster is configured to provide an application control channel in the application driven network; and
the access point in the access point cluster is configured to: provide an application data channel in the application driven network, and establish a communication channel with a terminal device for the terminal device to access the application driven network.

2. The communications system according to claim 1, wherein the core controller is further configured to:
allocate at least one network controller in the network controller cluster and at least one access point in the access point cluster to form a voice communications network as the application driven network when the application type is determined as a voice application type, wherein the at least one network controller establishes a voice signaling channel in the voice communications network, and the at least one access point forms a voice transmission channel in the voice communications network.

3. The communications system according to claim 2, wherein the application type is determined as the voice application type when the time-dependent distribution is a Poisson distribution.

4. The communications system according to claim 1, wherein the core controller is further configured to:
allocate at least one network controller in the network controller cluster and at least one access point in the access point cluster to form a data communication network as the application driven network when the application type is determined as a data application type, wherein the at least one network controller forms a data signaling control channel in the data communications network, and the at least one access point forms a data transmission channel in the data communications network.

5. The communications system according to claim 4, wherein the application type is determined as the data application type when the time-dependent distribution is a power-law distribution.

6. The communications system according to claim 1, wherein the core controller is further configured to:
allocate at least one network controller in the network controller cluster and at least one access point in the access point cluster to form a machine-to-machine network as the application driven network when the application type is determined as a machine-to-machine application type, wherein the at least one network controller forms a machine-to-machine signaling control channel in the machine-to-machine network, and the at least one access point forms a data transmission channel in the machine-to-machine network.

7. The communications system according to claim 6, wherein the application type is determined as the machine application type when the time-dependent distribution is a Markov distribution.

8. The communications system according to claim 1, wherein the core controller is further configured to:
allocate at least one network controller in the network controller cluster and at least one access point in the access point cluster to form an instant messaging network as the application driven network when the application type is determined as an instant messaging (IM) application type, wherein the at least one network controller forms an 1M signaling channel in the instant messaging network, and the at least one access point forms an 1M data channel in the instant messaging network.

9. A networking method of an application driven communications network, wherein the method comprises:
determining an application type of an application according to a time-dependent distribution of a quantity of connected users; and
allocating, by a core controller, at least one network controller in a network controller cluster according to the application type to form an application control channel of an application driven network; and
allocating, by the core controller, at least one access point in an access point cluster according to the application type to form an application data channel of the application driven network; wherein
the at least one network controller, the application control channel, the at least one access point, and the application data channel form the application driven network, and the application driven network provides a service for the application.

10. The method according to claim 9, wherein the method further comprises:
establishing, by an access point in the access point cluster, a communication channel with a terminal device for the terminal device to access the control channel and the application data channel in the application driven network.

11. The method according to claim 9, wherein the method further comprises:
when the time-dependent distribution is detected as a Poisson distribution, determining, by a core controller, that the application type is a voice application type, wherein the application driven network is a voice communications network, the application control channel is a voice signaling channel, and the application data channel is a voice transmission channel; and allocating, by the core controller, the at least one network controller to establish the voice signaling channel and the at least one access point to establish the voice transmission channel.

12. The method according to claim 9, wherein the method further comprises:

when the time-dependent distribution is detected as a power-law distribution, determining, by a core controller, that the application type is a data application, wherein the application driven network is a data communications network, the application control channel is a data signaling control channel, and the application data channel is a data transmission channel; and allocating, by the core controller, the at least one network controller to establish the data signaling control channel and the at least one access point to establish the data transmission channel.

13. The method according to claim 9, wherein the method further comprises:

when the distribution is detected as a Markov distribution, determining, by a core controller, that the application type is a machine-to-machine application, wherein the application driven network is a machine-to-machine network, the application control channel is a machine-to-machine signaling control channel, and the application data channel is a data transmission channel; and allocating, by the core controller, the at least one network controller to establish the machine-to-machine signaling control channel and the at least one access point to establish the data transmission channel.

14. A core controller, wherein the core controller comprises:

a processor, configured to determine an application type of an application according to a time-dependent distribution of a quantity of connected users, determine at least one network controller in a network controller cluster and at least one access point in an access point cluster according to the application type to form an application driven network, wherein the network controller provides an application control channel, the access point provides an application data channel, and the application driven network provides a service for the application;

a memory, configured to store a program that are executed by the processor for network control; and a transceiver, configured to receive and send information for the network controller cluster and the access point cluster.

15. The core controller according to claim 14, wherein the processor is further configured to: detect that the quantity of connected users accessing a network is distributed in a time domain as a Poisson distribution, and allocate the at least one network controller in the network controller cluster and the at least one access point in the access point cluster to form a voice communications network, wherein the at least one network controller establishes a voice signaling channel in the voice communications network, and the at least one access point forms a voice transmission channel in the voice communications network.

16. The core controller according to claim 14, wherein the processor is further configured to: detect that the quantity of connected users accessing a network is distributed in a time domain as a power-law distribution, and allocate the at least one network controller in the network controller cluster and the at least one access point in the access point cluster to form a data application network, wherein the at least one network controller forms a data signaling control channel in the data communications network, and the at least one access point forms a data transmission channel in the data communications network.

17. The core controller according to claim 14, wherein the processor is further configured to: detect that the quantity of connected users accessing a network is distributed in a time domain as a Markov distribution, and allocate the at least one network controller in the network controller cluster and the at least one access point in the access point cluster to form a machine-to-machine network, wherein the at least one network controller forms a machine-to-machine signaling control channel in the machine-to-machine network, and the at least one access point forms a data transmission channel in the machine-to-machine network.

18. The core controller according to claim 14, wherein the core controller further comprises a scheduling controller, and the scheduling controller is configured to: generate a management relationship for managing the access point in the application driven network, and send the management relationship to the network controller for scheduling management on the access point.

19. The core controller according to claim 14, wherein the core controller further comprises:

a scheduling controller configured to: generate a management relationship for managing the access point in the application driven network, and send the management relationship to the network controller for scheduling management on the access point according to a management policy, and the management policy comprises a QoS (Quality of Service) management policy, a QoE (Quality of Experience) management policy, or a priority queue management policy of the data channel of the access point.

* * * * *

UNITED STATES PATENT AND TRADEMARK OFFICE
CERTIFICATE OF CORRECTION

PATENT NO. : 10,616,792 B2
APPLICATION NO. : 15/976033
DATED : April 7, 2020
INVENTOR(S) : Yingtao Li et al.

It is certified that error appears in the above-identified patent and that said Letters Patent is hereby corrected as shown below:

In the Claims

Column 14, Line 32: Claim 8, delete "1M" and insert --IM-- therefore
Column 14, Line 34: Claim 8, delete "1M" and insert --IM-- therefore Signed and Sealed this
Sixteenth Day of June, 2020

Andrei Iancu
*Director of the United States Patent and Trademark Office*